(12) United States Patent
Jackson

(10) Patent No.: US 7,561,813 B2
(45) Date of Patent: Jul. 14, 2009

(54) WIDE FIELD OF VIEW HETERODYNE RECEIVER

(75) Inventor: John E. Jackson, Carol Stream, IL (US)

(73) Assignee: Northrop Grumman Corporation, Los Angeles, CA (US)

( * ) Notice: Subject to any disclaimer, the term of this patent is extended or adjusted under 35 U.S.C. 154(b) by 531 days.

(21) Appl. No.: 11/148,838

(22) Filed: Jun. 9, 2005

(65) Prior Publication Data

US 2007/0036557 A1 Feb. 15, 2007

(51) Int. Cl.
*H04B 10/06* (2006.01)

(52) U.S. Cl. .................. 398/204; 398/207; 398/212

(58) Field of Classification Search ........... 398/204, 398/207, 212, 203, 118, 130, 140
See application file for complete search history.

(56) References Cited

U.S. PATENT DOCUMENTS

| | | | | |
|---|---|---|---|---|
| 3,569,996 A | * | 3/1971 | Goell et al. ............... | 398/204 |
| 3,975,628 A | * | 8/1976 | Graves et al. ............. | 398/204 |
| 4,596,052 A | * | 6/1986 | Wright et al. ............. | 398/204 |
| 4,706,300 A | * | 11/1987 | Minemura et al. ......... | 398/204 |
| 4,723,315 A | * | 2/1988 | Wetherell ................. | 398/203 |
| 4,865,450 A | * | 9/1989 | Munechika et al. ....... | 356/489 |
| 5,003,625 A | * | 3/1991 | Khoe ...................... | 398/204 |
| 5,003,626 A | * | 3/1991 | Kuwahara et al. ......... | 398/204 |
| 5,033,856 A | | 7/1991 | Nose et al. | |
| 5,052,051 A | * | 9/1991 | Naito et al. .............. | 398/204 |
| 5,237,442 A | * | 8/1993 | Khoe et al. .............. | 398/203 |
| 5,353,109 A | * | 10/1994 | Langdon et al. .......... | 356/28.5 |
| 5,457,561 A | * | 10/1995 | Taneya et al. ............ | 398/120 |
| 5,479,259 A | | 12/1995 | Nakata et al. | |
| 5,548,434 A | * | 8/1996 | Shimonaka et al. ....... | 398/162 |
| 5,559,598 A | | 9/1996 | Matsumoto | |
| 5,589,938 A | | 12/1996 | Deck | |
| 5,610,705 A | * | 3/1997 | Brosnan et al. ........... | 356/28.5 |
| 5,694,216 A | | 12/1997 | Riza | |
| 5,734,478 A | * | 3/1998 | Magome et al. .......... | 356/401 |
| 5,751,830 A | * | 5/1998 | Hutchinson .............. | 382/103 |
| 5,777,741 A | | 7/1998 | Deck | |
| 5,781,294 A | | 7/1998 | Nakata et al. | |
| 5,867,604 A | | 2/1999 | Ben-Levy et al. | |
| 5,875,030 A | * | 2/1999 | Cooke et al. ............. | 356/484 |
| 5,923,423 A | | 7/1999 | Sawatari et al. | |
| 6,034,760 A | | 3/2000 | Rees | |
| 6,078,392 A | | 6/2000 | Thomas et al. | |
| 6,473,222 B2 | * | 10/2002 | Hait et al. ............... | 359/326 |

(Continued)

*Primary Examiner*—M. R. Sedighian
(74) *Attorney, Agent, or Firm*—Stetina Brunda Garred & Brucker

(57) ABSTRACT

A wide field of view heterodyne receiver is provided for enhancing mixing efficiency of a returned signal with a local oscillator signal to generate a heterodyned signal. The returned signal defines a first wave front, and the local oscillator signal defines a second wave front. The receiver includes an optics system, a local oscillator, and a focal plane array. The optics system is operative to transmit the returned signal along an optical path and to focus the returned signal onto a focal plane. The local oscillator is operative to provide the local oscillator signal being directable toward the focal plane. The focal plane array is disposed coincident with the focal plane and is operative to receive the focused returned signal and the local oscillator signal. Upon reaching the focal plane array, the first wave front and the second wave front are planar and oriented substantially parallel relative each other.

39 Claims, 7 Drawing Sheets

U.S. PATENT DOCUMENTS

| | | |
|---|---|---|
| 6,525,821 B1 | 2/2003 | Thomas et al. |
| 6,747,771 B2 | 6/2004 | Thomas et al. |
| 6,880,943 B2 * | 4/2005 | Fiete et al. .................. 359/850 |
| 6,969,176 B2 * | 11/2005 | Pohle .......................... 359/856 |
| 2003/0016364 A1 | 1/2003 | Thomas et al. |
| 2003/0081220 A1 | 5/2003 | Ostrovsky et al. |
| 2004/0042015 A1 | 3/2004 | Price |
| 2004/0145745 A1 | 7/2004 | Voelkl |
| 2004/0146295 A1 * | 7/2004 | Furman et al. .................. 398/9 |
| 2004/0212807 A1 * | 10/2004 | Hanson et al. ............... 356/458 |
| 2006/0170920 A1 * | 8/2006 | Granger ....................... 356/328 |
| 2006/0227317 A1 * | 10/2006 | Henderson et al. ............ 356/28 |
| 2006/0255275 A1 * | 11/2006 | Garman et al. ............ 250/338.1 |
| 2007/0024869 A1 * | 2/2007 | Ostrovsky et al. ............ 356/511 |

* cited by examiner

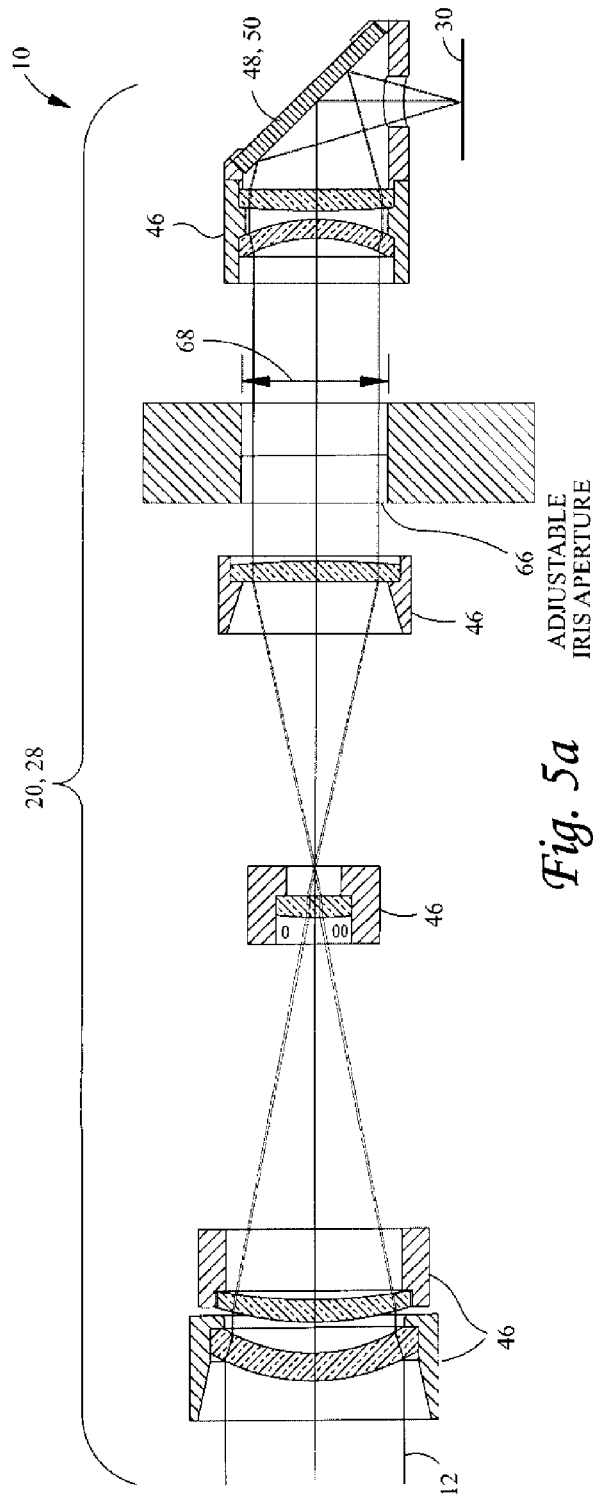
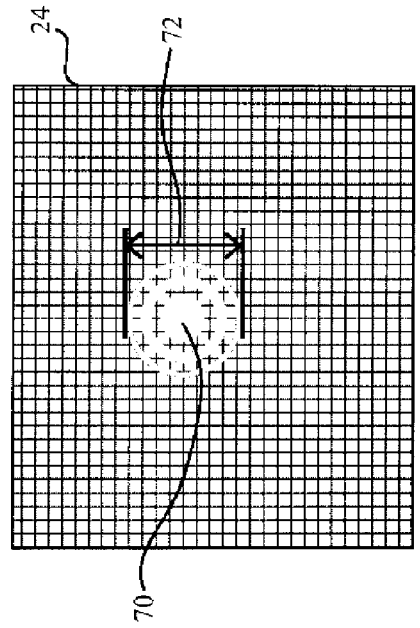
Fig. 5a
Fig. 5b

WIDE FIELD OF VIEW HETERODYNE RECEIVER

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

The present invention relates generally to the field of optical systems, and more particularly to a uniquely configured wide field of view heterodyne receiver specifically adapted to efficiently mix a received signal defining a first wave front and a local oscillator signal defining a second wave front with the first wave front and the second wave front each being planar and parallel relative to each other.

Optical heterodyne detection of a modulated input signal occurs through mixing the input signal with a stable, fixed frequency signal (often called a local oscillator) in a nonlinear device such as a tube, transistor, or diode mixer to create an output signal. The combination of the two signals may then produce an output signal that is either equal to either the sum or the difference of the two input frequencies. The output signal may then be filtered, rectified, and/or amplified. The output signal may also be analyzed to determine the frequency, amplitude, or phase of the input signal and thereby yield an image or other useful information based on the input signal. This process may allow the detection of otherwise undetectable high frequency signals, and has a tremendous variety of uses, such as applications in military (thermal imaging, target tracking, surveillance, communications, etc.), atmospheric analysis, and astronomy, just to name a few.

Heterodyne detection may be done passively or actively. In passive detection, the input signal consists of the background radiation derived from a target. The background radiation would then be heterodyned with a local oscillator signal to create the heterodyned signal. In active detection, a reference signal, such as a laser, may be directed toward and reflected off of the target. The signal that is reflected from the target will be modulated by the target. The reflected signal may then be heterodyned with a local oscillator to create the heterodyned signal. In both passive and active detection, properties of the target may be determined via analysis of the heterodyned signal.

One of the objectives of an optical system utilizing heterodyne detection is to increase the signal-to-noise-ratio of the system, which is the ratio of the magnitude of the signal to the magnitude of the noise present in the system. As unwanted radiation is filtered from the system, a theoretical best noise may be achieved through heterodyne detection. In this regard, heterodyne systems may become very sensitive and much more effective because unwanted noise may be reduced or eliminated.

Currently, heterodyne detection has two significant limitations. First, efficient heterodyne detection has typically only been possible for point sources. For example, a given system may allow detection of a single field point in order to determine properties of that point, such as for three dimensional shape measurements. Thus, present systems only accomplish heterodyne detection for single point sources, and not over a large field of view. A second weakness of current heterodyne systems is due to resultant astigmatisms, interference fringes, aberrations and/or other optical flaws that reduce the effectiveness of the system. Such optical flaws are result due to system design and configuration. In these respects, heterodyne detection has heretofore been limited in its utility.

Heterodyne detection has been significant for enhancing optical research and detection of low-level point sources of radiation. Additionally, optical detection may also be enhanced utilizing other technologies. Specifically, contemporary optical systems use a dewar to further enhance the efficiency and effectiveness of signal detection. The dewar tends to block background noise from reaching a detector. The dewar typically utilizes cryogenics to cool components of the system, such as a cold stop, the detector, and a cold filter, all of which are located behind an optical window in a vacuum-sealed environment. The cryogenic environment of the dewar aids in eliminating the thermal component of noise in a received signal. Currently, dewar technology is not apparently utilized in conjunction with heterodyne detection.

Therefore there is a need in the art for a heterodyne detection system that provides detection over a wide field of view. There is a need in the art for a heterodyne detection system that enhances mixing efficiency over a wide field of view. Additionally, there is a need in the art for a wide field of view heterodyne detection system that mitigates against optical flaws through an enhanced alignment and configuration. Finally, there is a need in the art for a wide field of view heterodyne receiver that tends to provide a high signal-to-noise ratio.

BRIEF SUMMARY OF THE INVENTION

In accordance with an embodiment of the present invention, a wide field of view heterodyne receiver is provided for enhancing mixing efficiency of a returned signal with a local oscillator signal to generate a heterodyned signal. The returned signal defines a first wave front. The receiver comprises: an optics system defining an optical path and a focal plane, the optics system being operative to transmit the returned signal along the optical path and to focus the returned signal onto the focal plane; a local oscillator being operative to provide the local oscillator signal, the local oscillator signal defining a second wave front and being directable toward the focal plane; and a focal plane array being disposed coincident with the focal plane and being operative to receive the focused returned signal and the local oscillator signal; wherein the first wave front is oriented substantially parallel relative to the second wave front at the focal plane and the receiver is operative to generate the heterodyned signal based on the focused returned signal and the local oscillator signal.

In an implementation of the present invention, the first wave front and the second wave front may each be planar and oriented substantially parallel relative to the focal plane. Additionally, the returned signal may have a wavelength within the infrared range. The returned signal may be a returned laser signal. The optical path may be telecentric.

According to another embodiment of the present invention, the returned signal may be focused onto the focal plane utilizing a reflective folding element. The reflective folding element may be a beam splitter being disposed along the optical path and being configured to focus the returned laser signal onto the focal plane.

The receiver may further include a cold filter and a dewar window being interposed between the focal plane array and the reflective folding element along the optical path. Moreover, the receiver may also include a collimation lens being positioned adjacent the local oscillator, the collimation lens defining a focal axis and being operative to receive the local oscillator signal from the local oscillator and to collimate and project the local oscillator signal toward the focal plane. In this regard, the focal axis of the collimation lens may be oriented substantially orthogonally relative to the focal plane.

According to an aspect of the present invention, the receiver may also include an adjustable iris aperture being disposed along the optical path and defining an aperture diameter, the returned signal passing through the adjustable iris aperture generating an airy spot on the focal plane array, the airy spot defining an airy spot diameter, the aperture diameter being adjustable to alter the size of the airy spot diameter.

In accordance with yet another implementation of the present invention, the receiver may further include a transmit signal generator being operative to direct a transmit signal at a target, the transmit signal being reflected by the target to produce the returned signal, the returned signal being detectable by the receiver.

In accordance with yet another aspect of the present invention, a method of generating a heterodyned signal utilizing a returned signal is provided. The returned signal defines a first wave front. The method comprises: transmitting the returned signal along an optical path; focusing the returned signal onto a focal plane; interfering a local oscillator signal with the returned signal at the focal plane, the local oscillator signal defining a second wave front, the first wave front being oriented substantially parallel relative to the second wave front at the focal plane; utilizing a focal plane array to receive the focused returned signal and the local oscillator signal; and generating a heterodyned signal based on the focused returned signal and the local oscillator signal. The first wave front and the second wave front may each be planar and oriented substantially parallel relative to the focal plane.

According to another embodiment of the present invention, the focusing step may further include utilizing a reflective folding element to focus the returned signal onto the focal plane. Additionally, the interfering step may further include collimating the local oscillator signal utilizing a collimation lens, the collimation lens defining a focal axis and being operative to receive the local oscillator signal and to collimate and project the local oscillator signal toward the focal plane.

In accordance with yet another embodiment of the present invention, the returned signal may pass through an adjustable iris aperture, the adjustable iris aperture being disposed along the optical path and defining an aperture diameter, the returned signal passing through the adjustable iris aperture generating an airy spot on the focal plane array, the airy spot defining an airy spot diameter, and the method may further include the step of adjusting the aperture diameter to alter the size of the airy spot diameter. In this regard, the transmitting step may further include transmitting the returned signal along the optical path wherein the optical path is telecentric.

BRIEF DESCRIPTION OF THE DRAWINGS

An illustrative and presently preferred embodiment of the invention is shown in the accompanying drawings in which:

FIG. 5a is a top plane view of the optics system of the receiver;

FIG. 5b is a front view of the focal plane array with an airy spot generated thereon;

DETAILED DESCRIPTION OF THE INVENTION

Figure 1:
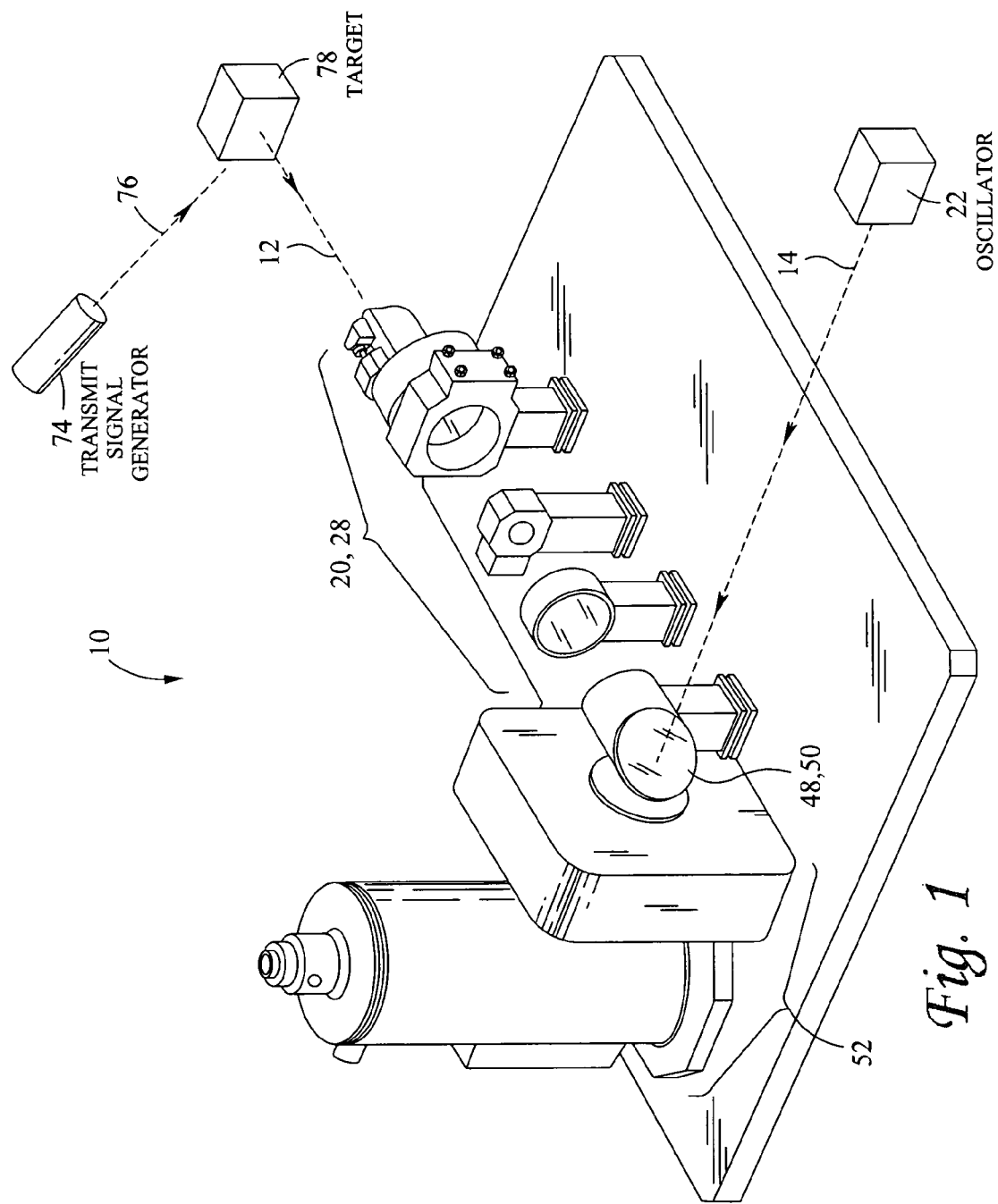
FIG. 1 is a perspective view of a wide field of view heterodyne receiver for enhancing mixing efficiency of a returned signal with a local oscillator signal to generate a heterodyned signal.

Referring now to the drawings wherein the showings are for purposes of illustrating the preferred embodiments of the present invention only and not for purposes of limiting the same, FIG. 1 is a perspective view of a wide field of view heterodyne receiver 10 for enhancing mixing efficiency of a returned signal 12 with a local oscillator signal 14 to generate a heterodyned signal 16. The returned signal 12 defines a first wave front 18. The receiver 10 comprises an optics system 20, a local oscillator 22, and a focal plane array 24.

As may be appreciated by one of skill in the art, it is contemplated that embodiments of the present invention may be selectively used to receive signals of varying wavelengths along the electromagnetic spectrum. However, according to a preferred embodiment of the present invention, the returned signal 12 may have a wavelength within the infrared range. More specifically, it is contemplated that embodiments of the present invention may achieve detection of near-mid infrared wavelengths. In this regard, the returned signal 12 may be a returned laser signal 26. Thus, applications utilizing embodiments of the present invention may include telescopes, spectrometers, other astronomical research tools, laser range finders and designators, and thermal sights.

Figure 2:
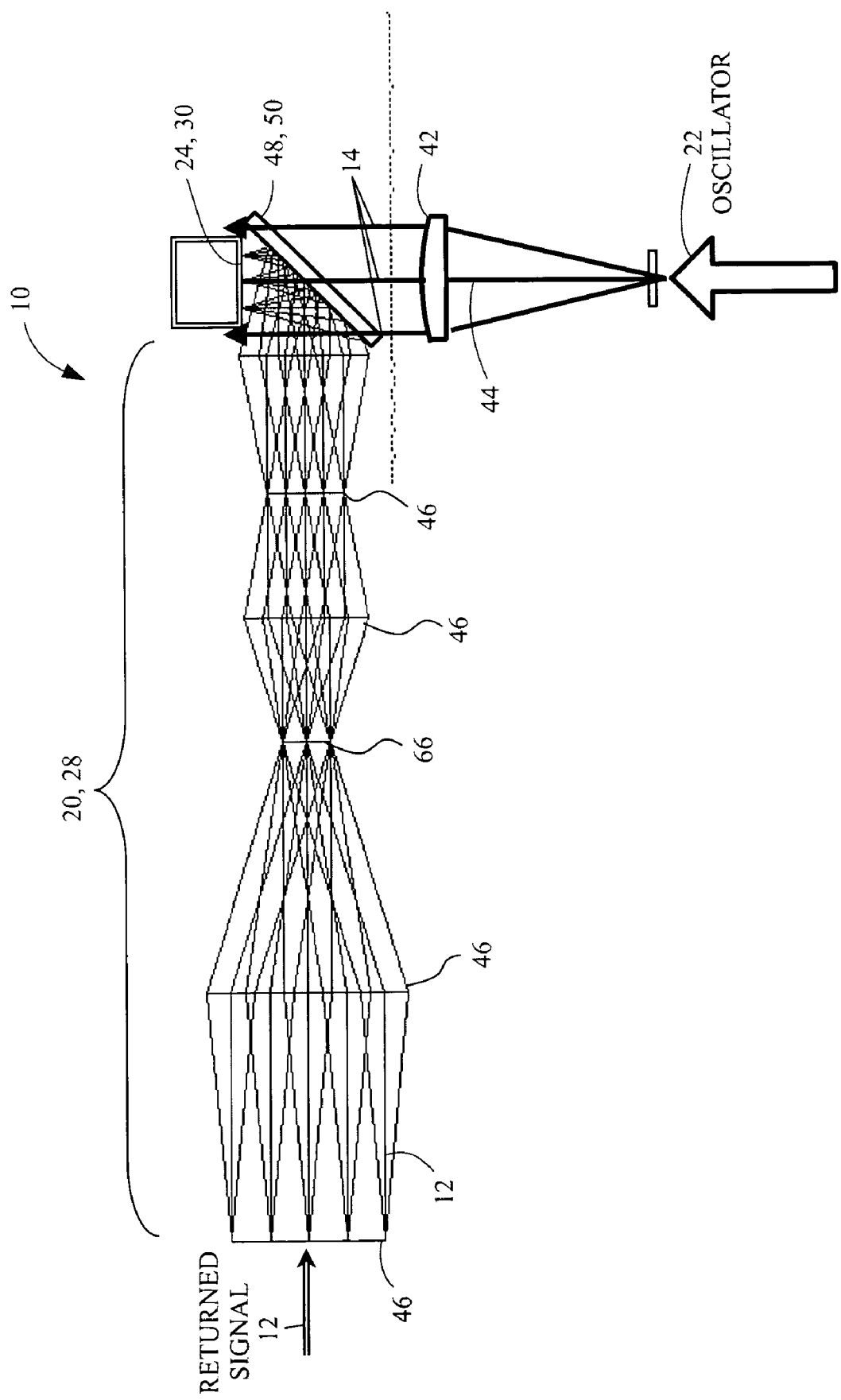
FIG. 2 is top plane view of the receiver including a local oscillator being operative to provide the local oscillator signal, and an optical path along which the returned signal may be transmitted and a reflective folding element which may be operative to focus the returned signal onto a focal plane.

Referring now to FIG. 2, the optics system 20 defines an optical path 28 and a focal plane 30. The optics system 20 may be operative to transmit the returned signal 12 along the optical path 28 and to focus the returned signal 12 onto the focal plane 30. The local oscillator 22 may be operative to provide the local oscillator signal 14. The local oscillator signal 14 defines a second wave front 32 and is directable toward the focal plane 30. The focal plane array 24 may be disposed coincident with the focal plane 30 and may be operative to receive the focused returned signal 12 and the local oscillator signal 14. According to a preferred embodiment of the present invention, the receiver 10 is configured with the first wave front 18 being oriented substantially parallel relative to the second wave front 32 at the focal plane 30. In this regard, efficient heterodyne mixing may therefore be achieved through a plane wave interface. The receiver 10 is operative to generate the heterodyne signal based on the focused returned signal 12 and the local oscillator signal 14.

According to an exemplary implementation of the present invention, the receiver 10 enhances the mixing efficiency of the returned signal 12 and the local oscillator signal 14 by ensuring that the first wave front 18 and the second wave front 32 are each planar upon reaching the focal plane 30 and the focal plane array 24 disposed therein. The first wave front 18 may therefore become planar as it approaches the focal plane array 24, which is described immediately below. As described further below, the second wave front 32 may also be planar.

Figure 3:
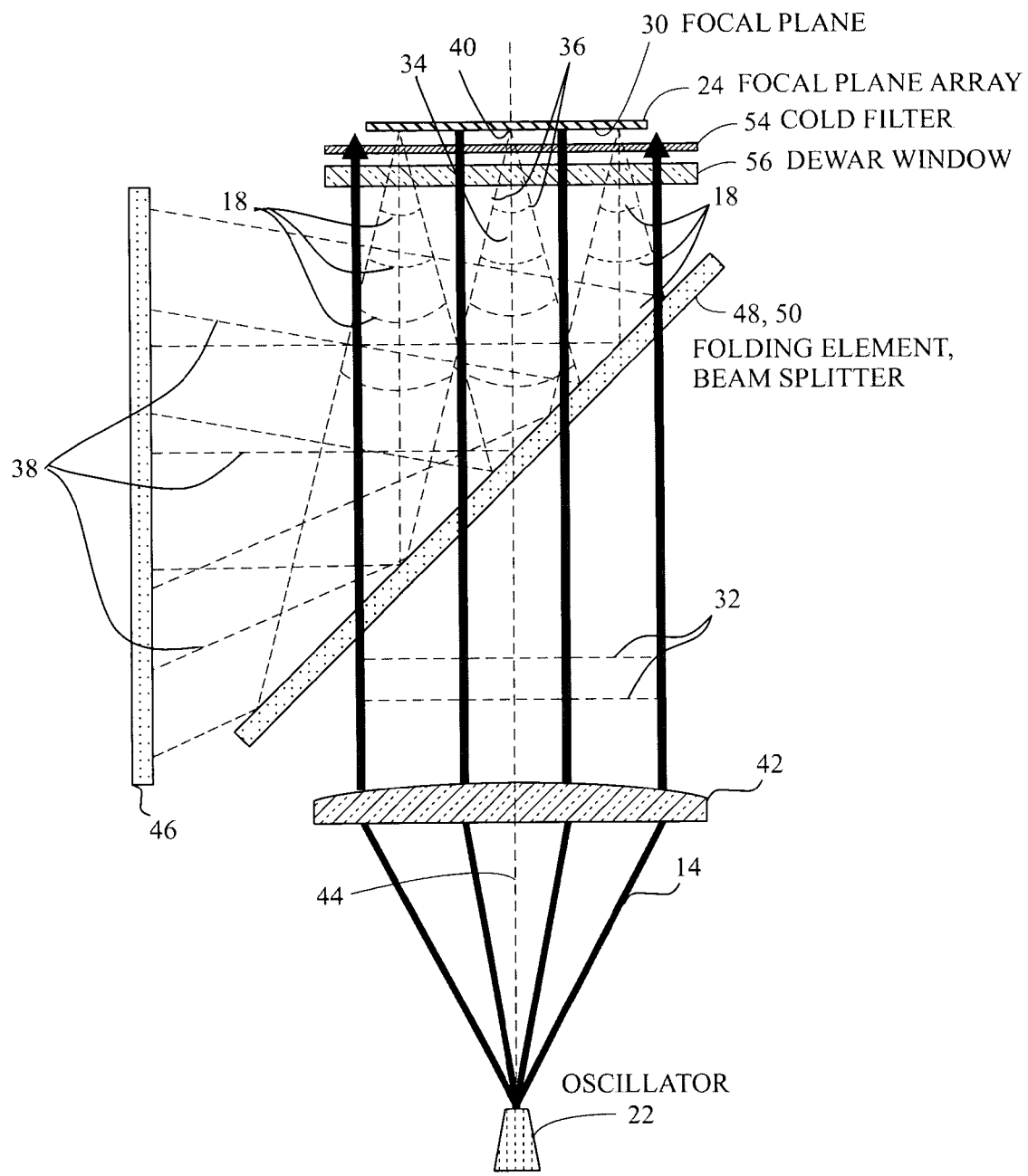
FIG. 3 is a top plane view of the receiver at the focal plane illustrating the wave front relationship of a first wave front defined by the returned signal and a second wave front defined by the local oscillator signal.

The first wave front 18 may be illustrated referring now to an embodiment shown in FIGS. 2 and 3. As shown therein, the returned signal 12 may be geometrically represented by a chief ray 34 and two flank ray traces 36. In these figures, the chief ray 34 and the flank ray traces 36 of three separate point sources are shown as detectable over a wide field of view. For example, a first point source of radiation 38 (which represents the returned signal 12, which may be background radiation or radiation reflected from a target 78) may be transmitted along the optical path 28 through a series of lenses, and focused onto the focal plane array 24 at a point of convergence 40. The point of convergence 40 represents the point at which the ray traces converge into the chief ray 34 upon reaching the focal plane 30. The chief ray 34 and ray traces may define the first wave front 18. As the chief ray 34 and ray traces converge to the point of convergence 40, the first wave front 18 is substantially spherical. However, the first wave front 18 may thus be planar and behave as such at the point of convergence 40. In other words, although the first point source converges as a cone, in which cone the first wave front 18 is spherical, the first wave front 18 may become planar upon convergence into the point of convergence 40. Thus, as shown in FIG. 3, the conical focusing of multiple point sources onto the focal plane 30 across a wide field of view may therefore provide that the first wave front 18 is planar at the point of convergence 40.

The second wave front 32 may also be illustrated referring to an embodiment in FIGS. 2 and 3. The second wave front 32 may become planar through use of a collimation lens 42. In this regard, the receiver 10 may further comprise the collimation lens 42 being positioned adjacent the local oscillator 22. The collimation lens 42 may define a focal axis 44 and may be operative to receive the local oscillator signal 14 from the local oscillator 22 and to collimate and project the local oscillator signal 14 toward the focal plane 30. Thus, according to an exemplary embodiment of the present invention, which may also provide a simplified alignment for the receiver 10, the collimation lens 42 may be used in conjunction with the local oscillator 22. In this regard, the focal axis 44 of the collimation lens 42 may be oriented substantially orthogonally relative to the focal plane 30.

In another embodiment of the present invention, mixing may further be enhanced with the first and second wave fronts 18, 32 being oriented substantially parallel relative to the focal plane 30 upon reaching the focal plane array 24. As shown in FIGS. 2 and 3, and as discussed above, the returned signal 12 and the local oscillator signal 14 may approach the focal plane 30 with the first wave front 18 and the second wave front 32 being planar. Thus, with the first wave front 18 and the second wave front 32 both being planar, it is contemplated that the first wave front 18 and the second wave front 32 may be aligned parallel relative to each other, which may further enhance efficient heterodyne mixing. However, it is contemplated that configurations other than those shown in FIGS. 2 and 3 may be designed with the first wave front 18 and the second wave front 32 being oriented parallel relative to each other.

As shown in FIGS. 2 and 5*a*, the optical path 28 may be telecentric. According to an aspect of the present invention, the telecentricity of the optics system 20 may allow the receiver 10 to avoid astigmatisms and other optical flaws associated with prior heterodyne receivers. The optics system 20 may thus include at least one lens 46. Further, it is contemplated that the optics system 20 may be configured to include zoom capabilities. In various embodiments of the invention, the lens may be made of ZnSe, Germanium or other materials. Such design parameters may be dictated according to advantageous properties of such materials, namely providing clarity, the ability to work with long wave bands, improved wave front correction, etc. In other embodiments of the present invention, the optics system 20 may include at least one plano-convex Ge asphere. Furthermore, in order to accommodate various wavelengths, it is contemplated that the optics system 20 may be modified to include fold mirrors disposed along the optical path 28. For example, certain wavelengths may require that the optics system 20 include up to three fold mirrors disposed along the optical path 28. All such configurations and combinations of lenses may be modified according to system requirements. Finally, it is contemplated that according to any configuration of the optics system 20, optical surfaces of the optics system 20 may not be parallel to each other within 2 mrad to 4 mrad in order to avoid interference fringes.

As shown in FIGS. 2 and 3, the returned signal 12 may be focused onto the focal plane 30 utilizing a reflective folding element 48. It is contemplated that the reflective folding element 48 may be a beam splitter 50 being disposed along the optical path 28 and being configured to fold the return signal 12 (or the returned laser signal 26) thereby focusing the return signal 12 (or the returned laser signal 26) onto the focal plane 30. According to an exemplary embodiment, the beam splitter 50 may have a reflectance to transmission ratio of 90:10. However, other ratios may be used. In addition, as shown, the beam splitter 50 may be oriented at a 45° angle relative to both the optical path 28 and the focal plane 30 in order to simplify overall geometric alignment of the receiver 10. Nevertheless, it is contemplated that the beam splitter 50 may be oriented at various angles relative to either the optical path 28 or the focal plane 30. Such design considerations may be made in order to enhance the simplicity, efficiency, and effectiveness of the receiver 10.

Figure 4:
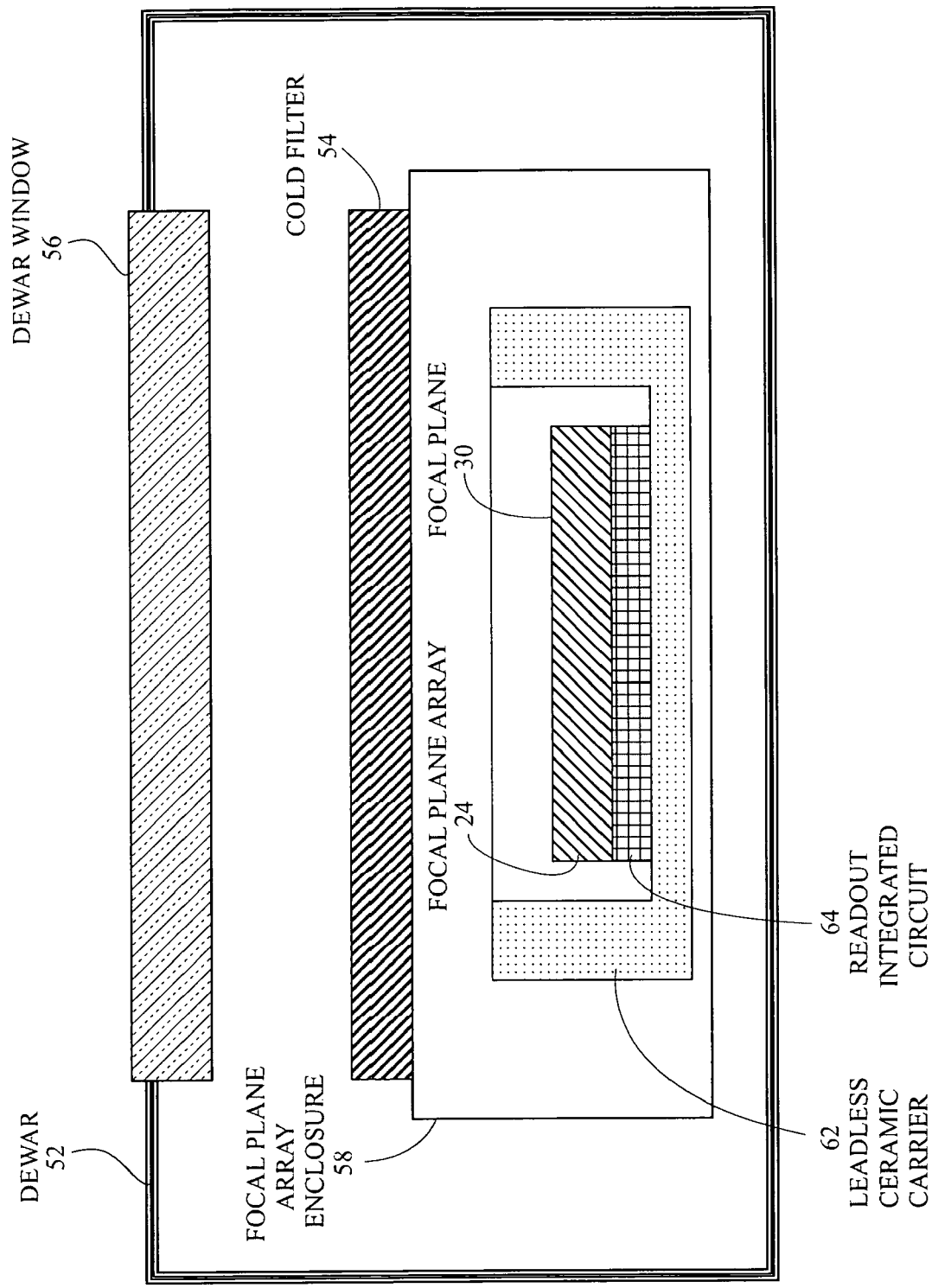
FIG. 4 is a top plane view of the receiver at the focal plane illustrating the spatial relationship of the focal plane array with a cold filter and a dewar window.

Referring now to FIG. 4, it is contemplated that the receiver 10 may further include a dewar 52. As illustrated in FIG. 4, the dewar 52 may include a cold filter 54, a dewar window 56, a focal plane array enclosure 58 (FPA enclosure), a dewar cold shield 60, a leadless ceramic carrier 62 (LCC), and a readout integrated circuit 64 (ROIC). In accordance with an aspect of the present invention, the receiver 10 may thus include the cold filter 54 and the dewar window 56 being interposed between the focal plane array 24 and the reflective folding element 48 along the optical path 28. Typical dewars, as presently available, may not be well-suited in implementations of the present invention. Therefore, modifications to the dewar 52 may need to be made in order to achieve greater mixing efficiency. For example, present dewars 52 utilize a cold stop for signals in the infrared range in order to reduce heat from the surroundings which may overcome a signal. However, according to a preferred embodiment of the present invention, the dewar 52 may be modified to exclude use of the cold stop. The exclusion of the cold stop may allow for a larger field of view for the focal plane array 24. Thus, the modified dewar 52 may include the focal plane array 24 being positioned within the dewar 52. The cold filter 54 may be a narrow bandpass filter (~1%) over an angular range of 0-15 degrees, although the cold filter 54 may be selected in response to system requirements. Further, the dewar window 56 may be specially modified according to system requirements. As appreciated by those of skill in the art, other modifications and specifications as deemed advantageous, may be incorporated into the design of the dewar 52.

The focal plane array 24 may also be configured according to the requirements of a given application. The focal plane array 24 may consist of various pixel counts, however, it is contemplated that a preferred embodiment of the invention may include a focal plane array 24 that is 300×300 pixels. Nevertheless, embodiments of the present invention may be configured to utilized focal plane arrays 24 that are larger or smaller than 300×300 pixels.

Referring now to FIG. 5a, according to yet another embodiment of the present invention, the receiver 10 may further include an adjustable iris aperture 66. The adjustable iris aperture 66 may be disposed along the optical path 28 and define an aperture diameter 68. It is contemplated that the adjustable iris aperture 66 may be motorized. As shown in FIG. 5a, the telecentricity of the optics system 20 may be set by the adjustable iris aperture 66. The returned signal 12 passing through the adjustable iris aperture 66 may generate an airy spot 70 on the focal plane array 24, and the airy spot 70 may define an airy spot diameter 72 on the focal plane array 24, as shown in FIG. 5b. The aperture diameter 68 may be adjustable to alter the size of the airy spot diameter 72 on the focal plane array 24. It is contemplated that by decreasing the aperture diameter 68, the airy spot diameter 72 may be increased across multiple pixels. The increased size of the airy spot diameter 72 may enable the receiver 10 to engage in tracking a particular point source of radiation. Thus, utilizing signal processing equipment, the receiver 10 may be configured to track a point source of radiation over a wide field of view.

As shown in FIG. 1, it is also contemplated that the receiver 10 may include a transmit signal generator 74. According to an aspect of the present invention, the receiver 10 may utilize the transmit signal generator 74 to track point sources of radiation. The transmit signal generator 74 may be operative to direct a transmit signal 76 at a target 78. Upon reaching the target 78, the transmit signal 76 may be reflected by the target 78 to produce the returned signal 12. The returned signal 12 may then be detectable by the receiver 10. As described above, manipulating the aperture diameter 68 of the adjustable iris aperture 66 may allow the airy spot diameter 72 to be increased, which may allow tracking of a point source of radiation over several pixels of the focal plane array 24. In particular, it is contemplated that the transmit signal 76 may be directed at the target 78 and that the target 78 may be tracked utilizing the manipulation of the size of the airy spot diameter 72 on the focal plane array 24. Other modifications may be incorporated in order to further modify and utilize the track function and other aspects of the present invention associated therewith.

Figure 6:
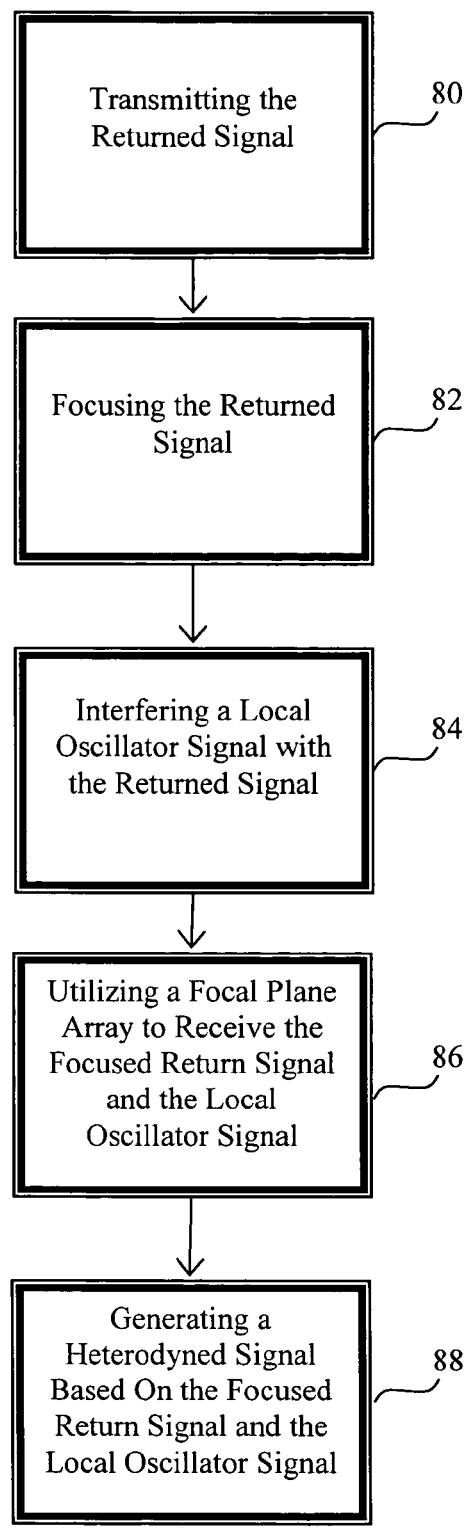
FIG. 6 is a block diagram illustrating an embodiment of a method of generating a heterodyned signal utilizing a returned signal.

Referring now to FIG. 6, a method of generating a heterodyne signal utilizing a returned signal 12 is provided. The returned signal 12 defines a first wave front 18. The method comprises the steps of transmitting the returned signal 12 along an optical path 28 (i.e. transmitting step 80); focusing the returned signal 12 onto a focal plane 30 (i.e. focusing step 82); interfering a local oscillator signal 14 with the returned signal 12 at the focal plane 30, the local oscillator signal 14 defining a second wave front 32, the first wave front 18 being oriented substantially parallel relative to the second wave front 32 at the focal plane 30 (i.e. interfering step 84); utilizing a focal plane array 24 to receive the focused returned signal 12 and the local oscillator signal 14 (i.e. receiving step 86); and generating a heterodyne signal based on the focused returned signal 12 and the local oscillator signal 14 (i.e. generating step 88).

According to an aspect of the present invention, the transmitting step 80 may include the transmission of a transmit signal 76 from a transmit signal generator 74. The transmit signal 76, as described herein, may be directed toward a target 78, which may be reflected off of the target 78 as the returned signal 12. The returned signal 12 may then be received by a wide field of view heterodyne receiver 10, and transmitted along the optical path 28 of the receiver 10. The returned signal 12 may be transmitted along the optical path 28 toward the focal plane 30. The optical path 28, as discussed herein, may include numerous configurations of transmissive and reflective elements, as required by the application.

In accordance with another aspect of the present invention, the focusing step 82 may include focusing the returned signal 12 onto the focal plane 30 utilizing at least a reflective folding element 48 disposed along the optical path 28. In addition to the reflective folding element 48, a lens may be utilized to focus the returned signal 12 onto the focal plane 30. As discussed herein, the reflective folding element 48 may be a beam splitter 50 (i.e., reflecting step 90). The beam splitter 50 may have a reflection to transmission ratio of 90:10. Additionally, the reflective folding element 48 may be oriented relative to the optical path 28 and the focal plane 30 in various configurations per design requirements. Therefore, the returned signal 12 may be transmitted along the optical path 28 and be reflected and focused, utilizing the beam splitter 50, onto the focal plane 30 for detection by the focal plane array 24.

Figure 7:
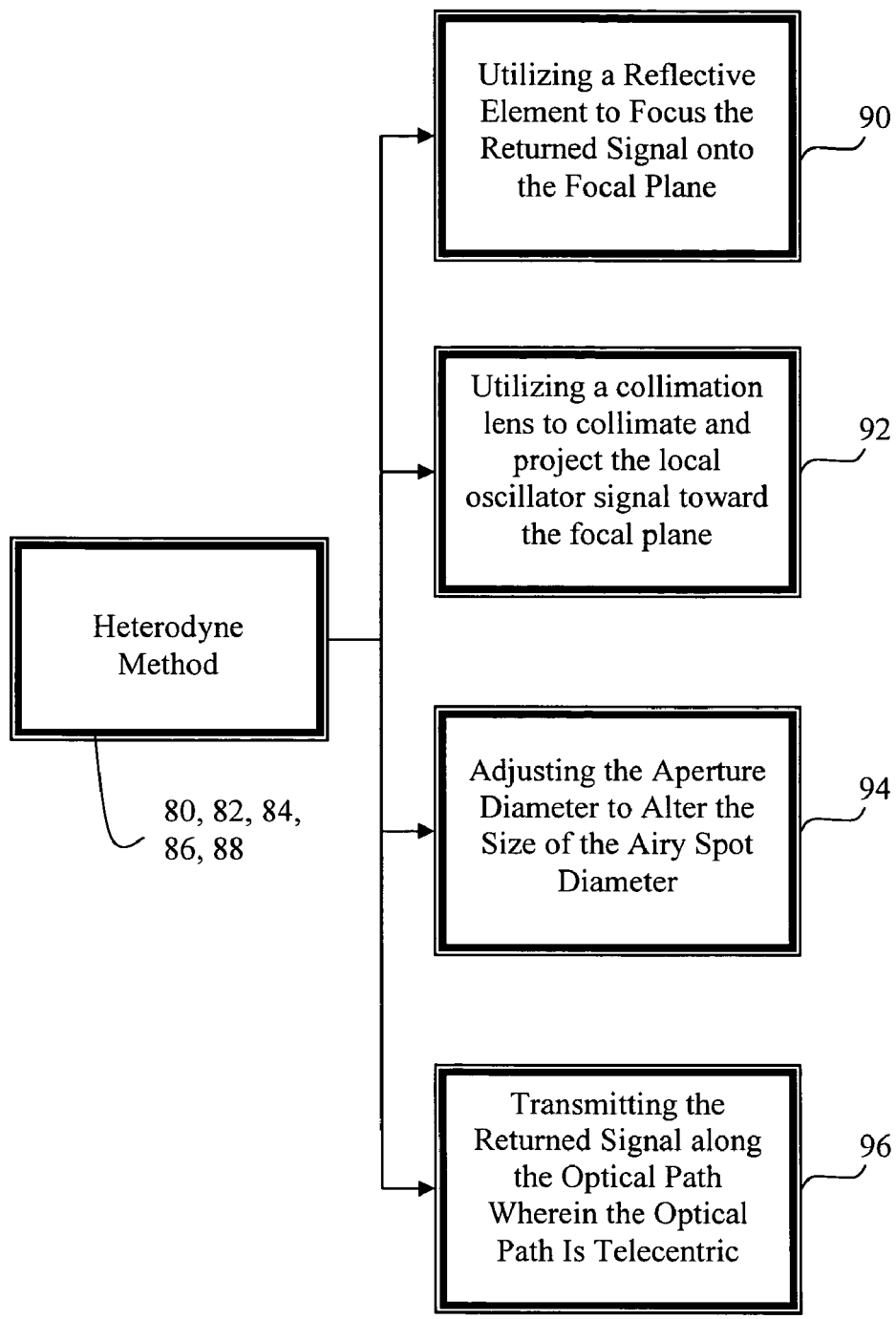
FIG. 7 is a block diagram illustrating other aspects of the method.

As also discussed herein, the interfering step 84 may include interfering the first wave front 18 and the second wave front 32 with each being planar. As illustrated in FIG. 7, the interfering step 84 of the method may further comprise collimating the local oscillator signal 14 utilizing a collimation lens 42 (i.e., collimating step 92). The collimation lens 42 may define a focal axis 44 and be operative to receive the local oscillator signal 14 as to collimate and project the local oscillator signal 14 toward the focal plane 30. Therefore, with the focal axis 44 of the collimation lens 42 being oriented orthogonal relative to the focal plane 30, it is contemplated that the interfering step 84 may include interfering the local oscillator 22 with the returned signal 12 utilizing a plane wave interface wherein the first wave front 18 and the second wave front 32 are oriented substantially parallel relative to the focal plane 30. In this regard, the first wave front 18 and the second wave front 32 may be oriented parallel relative to each other. However, it is contemplated that other configurations and embodiments may be utilized to efficiently and effectively interfere the local oscillator 22 with the returned signal 12 such that the first wave front 18 and the second wave front 32 are not oriented parallel relative to the focal plane 30.

The receiving step 86 may include detecting the returned signal 12 and the local oscillator signal 14 utilizing the focal plane array 24. Various modifications and configurations of the focal plane array 24, including utilization of a dewar 52, are contemplated and discussed herein. Further, according to an embodiment of the present invention, the generating step 88 may include utilizing signal processing equipment to generate the heterodyne signal based on the focused returned signal 12 and the local oscillator signal 14. As appreciated by one of skill in the art, the generation and processing of the heterodyned signal 16 may be accomplished utilizing signal processing equipment as required by a given application.

According to another embodiment of the present invention, the receiver 10 may be configured with the returned signal 12 passing through an adjustable iris aperture 66. The adjustable iris aperture 66 may be disposed along the optical path 28 and may define an aperture diameter 68 (i.e., adjusting step 94). As illustrated in FIGS. 1 and 2, the returned signal 12 may pass through the adjustable iris aperture 66 and define an airy spot diameter 72 on the focal plane array 24. In this regard, the method may further include the step of adjusting the aperture diameter 68 to alter the size of the airy spot diameter 72. As discussed above, this feature may allow for tracking of a point source of radiation.

According to yet another aspect of the present invention, the transmitting step 80 of the method may further include transmitting the returned signal 12 along the optical path 28 of an optics system 20. The optics system 20 may define the optical path 28 and may be telecentric (i.e., telecentric transmission step 96). As described herein, the optics system 20 may be configured to include reflective and transmissive elements as required by an application. Advantageous properties of certain materials and configurations may be known and utilized by those skilled in the art.

This description of the various embodiments of the present invention is presented to illustrate the preferred embodiments of the present invention, and other inventive concepts may be otherwise variously embodied and employed. The appended claims are intended to be construed to include such variations except insofar as limited by the prior art.

What is claimed is:

1. A wide field of view heterodyne receiver for enhancing mixing efficiency of a returned signal from at least one point source of radiation with a local oscillator signal to generate a heterodyned signal, the returned signal defining a first wave front, the receiver comprising:
   a. an optics system defining an optical path and a focal plane, the optics system being operative to transmit the returned signal along the optical path and to focus the returned signal onto the focal plane;
   b. a local oscillator being operative to provide the local oscillator signal, the local oscillator signal defining a second wave front and being directable toward the focal plane;
   c. a focal plane array being disposed coincident with the focal plane and being operative to receive the focused returned signal and the local oscillator signal; and
   d. an aperture disposed along the optical path and operative to pass the returned signal therethrough, the aperture being adjustable to selectively regulate the size of a field of view over which the point source of radiation is tracked;
   wherein the first wave front is oriented substantially parallel relative to the second wave front at the focal plane and the receiver is operative to generate the heterodyned signal based on the focused returned signal and the local oscillator signal.

2. The receiver of claim 1 wherein the first wave front and the second wave front are each planar and oriented substantially parallel relative to the focal plane.

3. The receiver of claim 1 wherein the returned signal has a wavelength within the infrared range.

4. The receiver of claim 1 wherein returned signal is a returned laser signal.

5. The receiver of claim 1 wherein the optical path is telecentric.

6. The receiver of claim 1 wherein the returned signal is focused onto the focal plane utilizing a reflective folding element.

7. The receiver of claim 6 wherein the reflective folding element is a beam splitter being disposed along the optical path and being configured to focus the returned laser signal onto the focal plane.

8. The receiver of claim 6 further comprising a cold filter and a dewar window being interposed between the focal plane array and the reflective folding element along the optical path.

9. The receiver of claim 1 further comprising a collimation lens being positioned adjacent the local oscillator, the collimation lens defining a focal axis and being operative to receive the local oscillator signal from the local oscillator and to collimate and project the local oscillator signal toward the focal plane.

10. The receiver of claim 9 wherein the focal axis of the collimation lens is oriented substantially orthogonally relative to the focal plane.

11. The receiver of claim 1 wherein the aperture is an adjustable iris aperture disposed along the optical path and defining an aperture diameter, the returned signal passing through the adjustable iris aperture generating an airy spot on the focal plane array, the airy spot defining an airy spot diameter, the aperture diameter being adjustable to alter the size of the airy spot diameter.

12. The receiver of claim 1 further including a transmit signal generator being operative to direct a transmit signal at a target, the transmit signal being reflected by the target to produce the returned signal, the returned signal being detectable by the receiver.

13. A method of generating a heterodyned signal utilizing a returned signal from at least one point source of radiation, the returned signal defining a first wave front, the method comprising:
   a. transmitting the returned signal along an optical path;
   b. passing the returned signal through an aperture disposed along the optical path;
   c. focusing the returned signal onto a focal plane;
   d. interfering a local oscillator signal with the returned signal at the focal plane, the local oscillator signal defining a second wave front, the first wave front being oriented substantially parallel relative to the second wave front at the focal plane;
   e. utilizing a focal plane array to receive the focused returned signal and the local oscillator signal;
   f. adjusting the aperture to selectively regulate the size of a field of view over which the point source of radiation is tracked; and
   g. generating a heterodyned signal based on the focused returned signal and the local oscillator signal.

14. The method of claim 13 wherein the first wave front and the second wave front are each planar and oriented substantially parallel relative to the focal plane.

15. The method of claim 13 wherein the focusing step further comprises utilizing a reflective folding element to focus the returned signal onto the focal plane.

16. The method of claim 13 wherein the interfering step further comprises collimating the local oscillator signal utilizing a collimation lens, the collimation lens defining a focal axis and being operative to receive the local oscillator signal and to collimate and project the local oscillator signal toward the focal plane.

17. The method of claim 13 wherein the returned signal passes through an aperture that is an adjustable iris aperture, the adjustable iris aperture being disposed along the optical path and defining an aperture diameter, the returned signal passing through the adjustable iris aperture generating an airy spot on the focal plane array, the airy spot defining an airy spot diameter, the method further including the step of adjusting the aperture diameter to alter the size of the airy spot diameter.

18. The method of claim 13 wherein the transmitting step further includes transmitting the returned signal along the optical path wherein the optical path is telecentric.

19. The receiver of claim 1, wherein the aperture is adjustable to selectively regulate the size of the field of view over which the point source of radiation is tracked independently of any movement of the focal plane.

20. The receiver of claim 1, wherein the aperture is adjustable to selectively regulate an area of the focal plane array that is irradiated by the optics system.

21. The receiver of claim 1 wherein the focal plane array comprises a multi-pixel array, and wherein the aperture is adjustable to selectively regulate an area of the multi-pixel array over which the point source of radiation is tracked.

22. The receiver of claim 1 wherein the aperture comprises an adjustable iris aperture.

23. The receiver of claim 1 wherein the adjustable aperture is motorized.

24. The receiver of claim 11 wherein the focal plane array comprises a multi-pixel array, and wherein the adjustable iris aperture is adjustable to selectively regulate the size of the airy spot diameter on the multi-pixel array over which the point source of radiation is tracked.

25. The method of claim 13 wherein step (f) comprises adjusting the aperture to selectively regulate the size of the field of view over which the point source of radiation is tracked independently of any movement of the focal plane.

26. The method of claim 13 wherein step (f) comprises adjusting the aperture to selectively regulate an area of the focal plane array that is irradiated by the focused returned signal and the local oscillator system.

27. The method of claim 13 wherein step (e) comprises utilizing a focal plane array that is a multi-pixel array, and wherein step (f) comprises adjusting the aperture to selectively regulate an area of the multi-pixel array over which the point source of radiation is tracked.

28. The method of claim 13 wherein step (b) comprises passing the returned signal through an adjustable iris aperture.

29. The method of claim 13 wherein step (f) comprises motorized adjustment of the aperture.

30. The method of claim 17 wherein step (e) comprise utilizing a focal plane array that is a multi-pixel array, and wherein step (f) comprise adjusting the adjustable iris aperture to selectively regulate the size of the airy spot diameter on the multi-pixel array over which the point source of radiation is tracked.

31. A wide field of view heterodyne receiver for enhancing mixing efficiency of a returned signal with a local oscillator signal to generate a heterodyned signal, the returned signal defining a first wave front, the receiver comprising:
   a. an optics system defining an optical path and a focal plane, the optics system being operative to transmit the returned signal along the optical path and to focus the returned signal onto the focal plane;
   b. a local oscillator being operative to provide the local oscillator signal, the local oscillator signal defining a second wave front and being directable toward the focal plane;
   c. a focal plane array being disposed coincident with the focal plane and being operative to receive the focused returned signal and the local oscillator signal; and
   d. an adjustable iris aperture being disposed along the optical path and defining an aperture diameter, the returned signal passing through the adjustable iris aperture generating an airy spot on the focal plane array, the airy spot defining an airy spot diameter, the aperture diameter being adjustable to alter the size of the airy spot diameter;
   wherein the first wave front is oriented substantially parallel relative to the second wave front at the focal plane and the receiver is operative to generate the heterodyned signal based on the focused returned signal and the local oscillator signal.

32. A method of generating a heterodyned signal utilizing a returned signal, the returned signal defining a first wave front, the method comprising:
   a. transmitting the returned signal along an optical path;
   b. focusing the returned signal onto a focal plane;
   c. interfering a local oscillator signal with the returned signal at the focal plane, the local oscillator signal defining a second wave front, the first wave front being oriented substantially parallel relative to the second wave front at the focal plane;
   d. utilizing a focal plane array to receive the focused returned signal and the local oscillator signal;
   e. passing the returned signal through an adjustable iris aperture, the adjustable iris aperture being disposed along the optical path and defining an aperture diameter, the returned signal passing through the adjustable iris aperture generating an airy spot on the focal plane array, the airy spot defining an airy spot diameter, and adjusting the aperture diameter to alter the size of the airy spot diameter; and
   f. generating a heterodyned signal based on the focused returned signal and the local oscillator signal.

33. A wide field of view heterodyne receiver for enhancing mixing efficiency of a returned signal from at least one point source of radiation with a local oscillator signal to generate a heterodyned signal, the returned signal defining a first wave front, the receiver comprising:
   a. an optics system defining an optical path and a focal plane, the optics system being operative to transmit the returned signal along the optical path and to focus the returned signal onto the focal plane;
   b. a local oscillator being operative to provide the local oscillator signal, the local oscillator signal defining a second wave front and being directable toward the focal plane;
   c. a focal plane array being disposed coincident with the focal plane and being operative to receive the focused returned signal and the local oscillator signal; and
   d. an aperture disposed along the optical path and operative to pass the returned signal therethrough, the aperture being adjustable to selectively regulate an area of the focal plane array that is irradiated by the optics system, and thereby selectively regulate the size of a field of view over which the point source of radiation is tracked;
   wherein the first wave front is oriented substantially parallel relative to the second wave front at the focal plane and the receiver is operative to generate the heterodyned signal based on the focused returned signal and the local oscillator signal.

34. A wide field of view heterodyne receiver for enhancing mixing efficiency of a returned signal from at least one point source of radiation with a local oscillator signal to generate a heterodyned signal, the returned signal defining a first wave front, the receiver comprising:
   a. an optics system defining an optical path and a focal plane, the optics system being operative to transmit the returned signal along the optical path and to focus the returned signal onto the focal plane;
   b. a local oscillator being operative to provide the local oscillator signal, the local oscillator signal defining a second wave front and being directable toward the focal plane;
   c. a focal plane array being disposed coincident with the focal plane and being operative to receive the focused returned signal and the local oscillator signal, the focal plane array comprising a multi-pixel array; and d. an aperture disposed along the optical path and operative to pass the returned signal therethrough, the aperture being adjustable to selectively regulate an area of the multi-pixel array over which the point source of radiation is tracked;

wherein the first wave front is oriented substantially parallel relative to the second wave front at the focal plane and the receiver is operative to generate the heterodyned signal based on the focused returned signal and the local oscillator signal.

35. A method of generating a heterodyned signal utilizing a returned signal from at least one point source of radiation, the returned signal defining a first wave front, the method comprising:

a. transmitting the returned signal along an optical path;
b. passing the returned signal through an aperture disposed along the optical path;
c. focusing the returned signal onto a focal plane;
d. interfering a local oscillator signal with the returned signal at the focal plane, the local oscillator signal defining a second wave front, the first wave front being oriented substantially parallel relative to the second wave front at the focal plane;
e. utilizing a focal plane array to receive the focused returned signal and the local oscillator signal;
f. adjusting the aperture to selectively regulate an area of the focal plane array that is irradiated by the focused returned signal and the local oscillator system, thereby selectively regulating the size of a field of view over which the point source of radiation is tracked; and
g. generating a heterodyned signal based on the focused returned signal and the local oscillator signal.

36. A method of generating a heterodyned signal utilizing a returned signal from at least one point source of radiation, the returned signal defining a first wave front, the method comprising:

a. transmitting the returned signal along an optical path;
b. passing the returned signal through an aperture disposed along the optical path;
c. focusing the returned signal onto a focal plane;
d. interfering a local oscillator signal with the returned signal at the focal plane, the local oscillator signal defining a second wave front, the first wave front being oriented substantially parallel relative to the second wave front at the focal plane;
e. utilizing a focal plane array that is a multi-pixel array to receive the focused returned signal and the local oscillator signal;
f. adjusting the aperture to selectively regulate an area of the multi-pixel array over which the point source of radiation is tracked; and
g. generating a heterodyned signal based on the focused returned signal and the local oscillator signal.

37. The receiver of claim 31 wherein the focal plane array comprises a multi-pixel array, and wherein the adjustable iris aperture is adjustable to selectively regulate the size of the airy spot diameter on the multi-pixel array over which the point source of radiation is tracked.

38. The method of claim 32, wherein step (e) comprise utilizing a focal plane array that is a multi-pixel array, and wherein step (f) comprise adjusting the adjustable iris aperture to selectively regulate the airy spot diameter on the multi-pixel array over which the point source of radiation is tracked.

39. A wide field of view heterodyne receiver for enhancing mixing efficiency of a returned signal from at least one point source of radiation with a local oscillator signal to generate a heterodyned signal, the returned signal defining a first wave front, the receiver comprising:

a. an optics system defining an optical path and a focal plane, the optics system being operative to transmit the returned signal along the optical path and to focus the returned signal onto the focal plane utilizing a reflecting folding element;
b. a local oscillator being operative to provide the local oscillator signal, the local oscillator signal defining a second wave front and being directable toward the focal plane;
c. a focal plane array being disposed coincident with the focal plane and being operative to receive the focused returned signal and the local oscillator signal; and
d. an aperture disposed along the optical path and operative to pass the returned signal therethrough, the aperture being adjustable to selectively regulate the size of a field of view over which the point source of radiation is tracked;
e. a cold filter and a dewar window interposed between the focal plane array and the reflective folding element along the optical path;

wherein the first wave front is oriented substantially parallel relative to the second wave front at the focal plane and the receiver is operative to generate the heterodyned signal based on the focused returned signal and the local oscillator signal.

* * * * *